(12) United States Patent
Chien

(10) Patent No.: US 7,495,853 B2
(45) Date of Patent: Feb. 24, 2009

(54) APPARATUS FOR MANIPULATING LENSES

(75) Inventor: Yang-Chang Chien, Tu-Cheng (TW)

(73) Assignee: Hon Hai Precision Industry Co., Ltd., Tu-Cheng, Taipei Hsien ( * ) Notice: Subject to any disclaimer, the term of this patent is extended or adjusted under 35 U.S.C. 154(b) by 107 days.

(21) Appl. No.: 11/309,555

(22) Filed: Aug. 21, 2006

(65) Prior Publication Data

US 2007/0137799 A1   Jun. 21, 2007

(30) Foreign Application Priority Data

Dec. 15, 2005   (CN) .................. 2005 1 0120701

(51) Int. Cl.
*G02B 7/02* (2006.01)
*G03B 13/00* (2006.01)
*E06B 9/36* (2006.01)

(52) U.S. Cl. ................. 359/822; 348/357; 160/176.1 V

(58) Field of Classification Search ................. 359/811, 359/813, 818, 819, 822, 823, 824, 826; 348/357; 160/176.1, 176.1 V See application file for complete search history.

(56) References Cited

U.S. PATENT DOCUMENTS

| 2004/0033768 A1* | 2/2004 | Diehl et al. ................. 451/339 |
| 2006/0170814 A1* | 8/2006 | Tsai ........................... 348/357 |
| 2007/0070531 A1* | 3/2007 | Lu ............................ 359/851 |

\* cited by examiner

*Primary Examiner*—Ricky Mack
*Assistant Examiner*—Mahidere S Sahle
(74) *Attorney, Agent, or Firm*—Andrew C. Cheng

(57) ABSTRACT

An apparatus for manipulating a camera lens includes a frame (32), a driving rod (34), a linking rod (36), and a driven rod (38). A guiding member (40) is formed on a side surface of the frame including a through hole (400) defined therein. One end of the driving rod pivotedly connected to the frame. One end of the linking rod is pivotedly connected to the other end of the driving rod. The driven rod extends through the through hole of the guiding member. One end of the driven rod is pivotedly connected to the other end of the linking rod, and the other end includes a lens-holder configured for holding the lens.

10 Claims, 7 Drawing Sheets

APPARATUS FOR MANIPULATING LENSES

1. FIELD OF THE INVENTION

The present invention relates to apparatuses for manipulating lenses.

2. DESCRIPTION OF RELATED ART

In recent years, camera modules for taking photos have begun to be incorporated in mobile terminals such as mobile phones and lap-top computers. Downsizing the camera modules is a prerequisite for enhancing the portability of these apparatuses. Thus, the requirement of apparatuses for auto-manipulatable lenses has been increased.

Generally, a typical apparatus 10 for manipulating lenses, referring to FIG. 7, is a linear pneumatic cylinder apparatus. The apparatus 10 includes a pneumatic cylinder 12, and a driven rod 14. One end of the driven rod 14 is connected to the pneumatic cylinder 12 and slides therein. The other end of the driven rod 14 includes a lens-holder 16. In operation, the lens-holder 16 secures a lens 18, and then the pneumatic cylinder 12 pushes the lens 18 into a barrel 20 through the driven rod 14. The cylinder 12, the driven rod 14, and the barrel 20 are generally aligned so that the lens 18 is assembled into the barrel 20 linearly.

However, the lens 18 may easily be tilted, scratched, or broken because of the orientation problems caused by the apparatus 10. One way to solve the problem is to slow down the speed of the pneumatic cylinder 12. In this way, while the aforementioned problem is solved in certain degree, the yield of the lens modules is decreased.

Therefore, what is needed is an apparatus for manipulating lens with high and stable yield.

SUMMARY OF THE INVENTION

An apparatus for manipulating a camera lens in accordance with a preferred embodiment includes a frame, a driving rod, a linking rod, and a driven rod. A guiding member is formed on a side surface of the frame including a through hole defined therein. One end of the driving rod is pivotely connected to the frame. One end of the linking rod pivotedly is connected to the other end of the driving rod. The driven rod extends through the through hole of the guiding member. One end of the driven rod pivotedly connected to the other end of the linking rod, and the other end comprising a lens-holder configured for holding the lens.

An apparatus for manipulating a camera lens in accordance with another embodiment includes a frame, a driving rod, a linking rod, and a driven rod. The frame has a guiding member, and the guiding member defines a guideway. The driving rod has a first end pivotedly connected to the frame, and an opposite second end. The driven rod is movable lengthwise in the guideway of the guiding member. The driven rod has a lens holder arranged at a first end thereof configured for holding a lens, and an opposite second end. The linking rod pivotedly interconnects between the second end of the driving rod and the second end of the driven rod.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Reference will now be made to the drawings to describe in detail the preferred embodiments of the present apparatus for manipulating lens.

Figure 1:
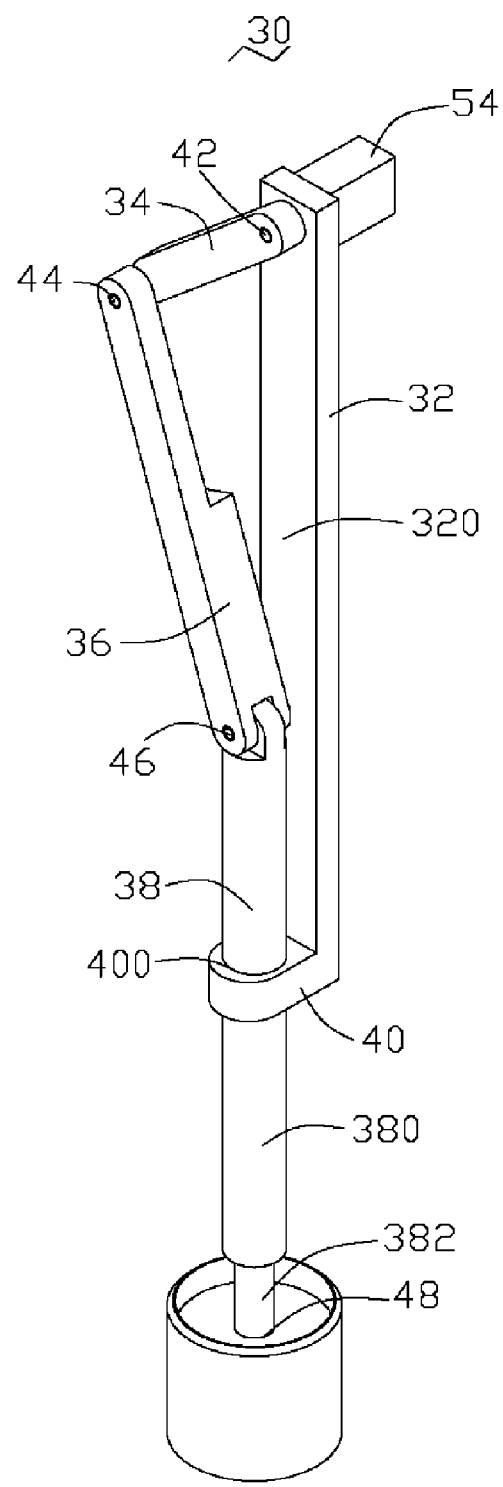
FIG. 1 is a schematic, isometric views of an apparatus for manipulating lens in accordance with a preferred embodiment.
Figure 2:
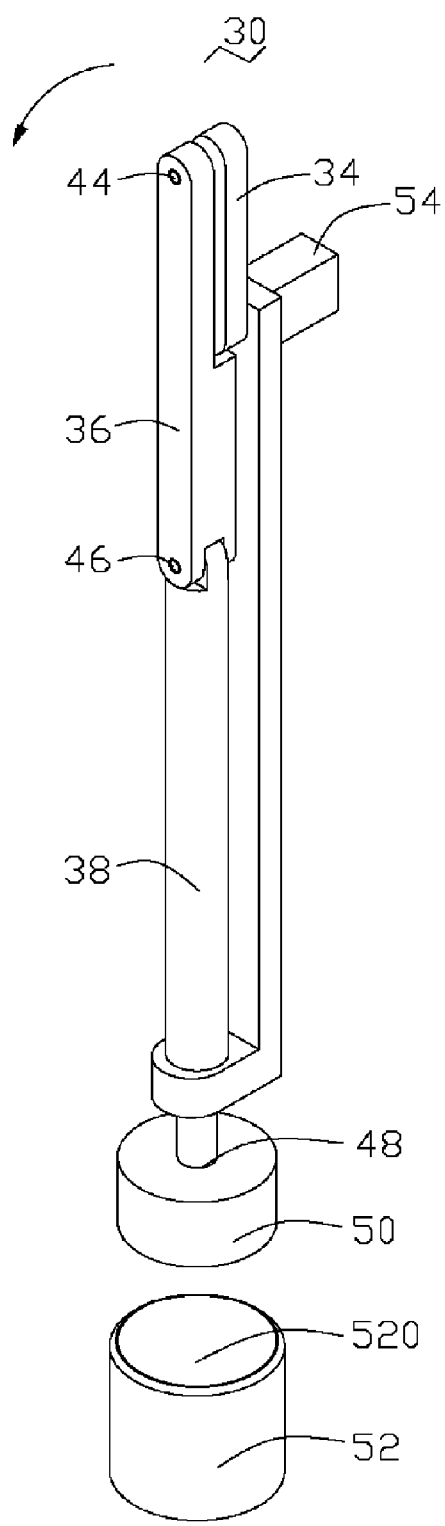
FIGS. 2 to 6 are schematic, isometric views of the apparatus of FIG. 1 in different positions.
Figure 3:
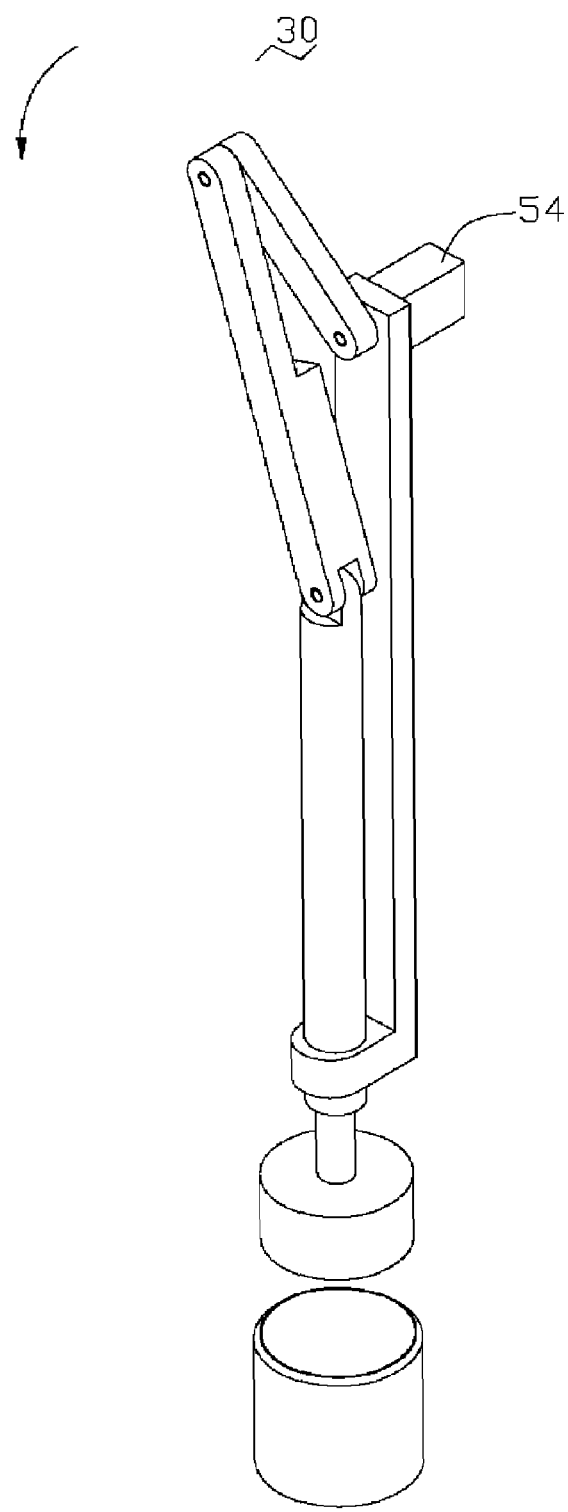

Referring to FIG. 1, an apparatus 30 mainly includes a frame 32, a driving rod 34, a linking rod 36, and a driven rod 38. A guiding member 40 with a through hole 400 therein protrudes out from a side surface 320 of the frame 32 and is located on a lower portion of the frame 32. One end of the driving rod 34 is connected to an upper portion of the frame 32 by a first pivot 42 and is positioned on the same side surface 320 of the frame 32. The other end of the driving rod 34 is connected to the upper portion of the linking rod 36 by a second pivot 44. One end of the driven rod 38 is connected with the other end of the linking rod 36 by a third pivot 46, and meanwhile the driven rod 38 is inserted through the through hole 400 of the guiding member 40. The other end of the driven rod 38 includes a lens-holder 48. The first pivot 42 and the third pivot 46 which join the frame 32 and the connecting links to the driving rod 34, the linking rod 36 and the driven rod 38 are generally in a axis of the through hole 400. The driven rod 38 is lengthwise movable in a guideway defined by the guiding member 40.

In the illustrated embodiment, the apparatus 30 may further include a motor 54, which is configured for driving the driving rod 34 to rotate. The driven rod 38 can be a telescoping assembly including an outer tube 380 and an inner tube 382 slidably received in the outer tube 382. The lens-holder 48 in the illustrated embodiment includes a suction nozzle or a clamping jaw.

Figure 4:
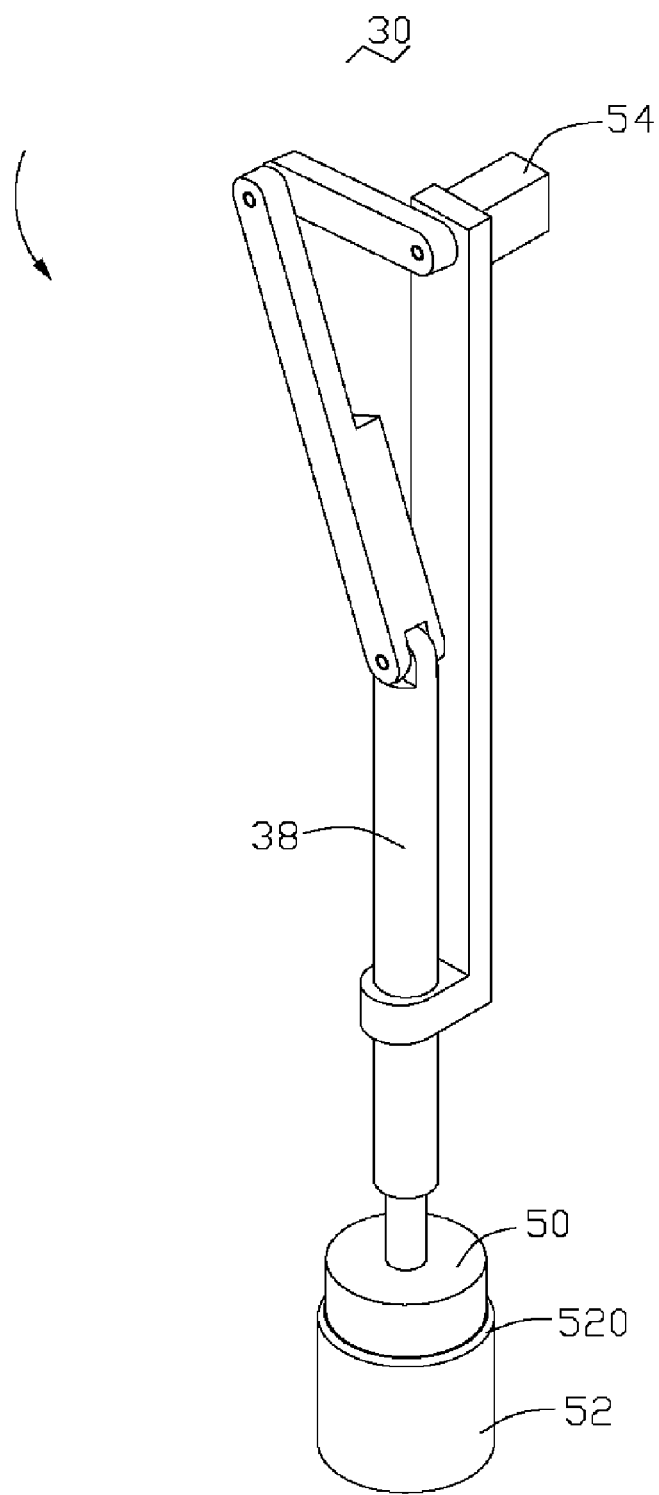
Figure 5:
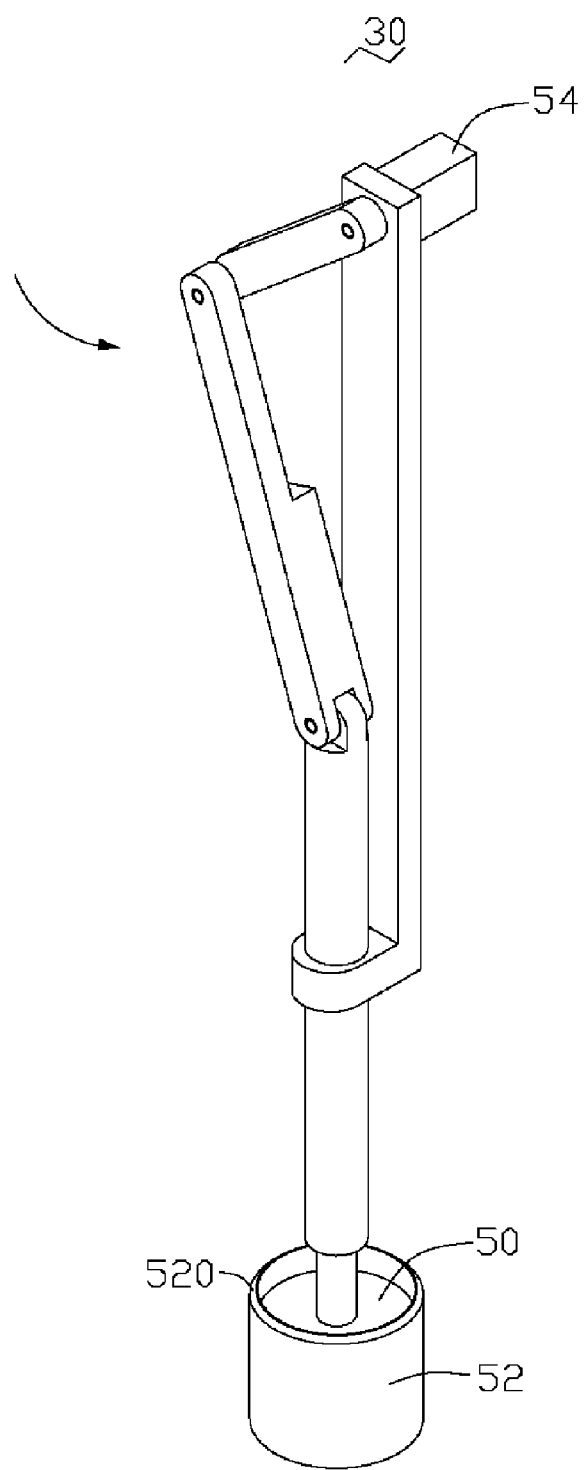
Figure 6:
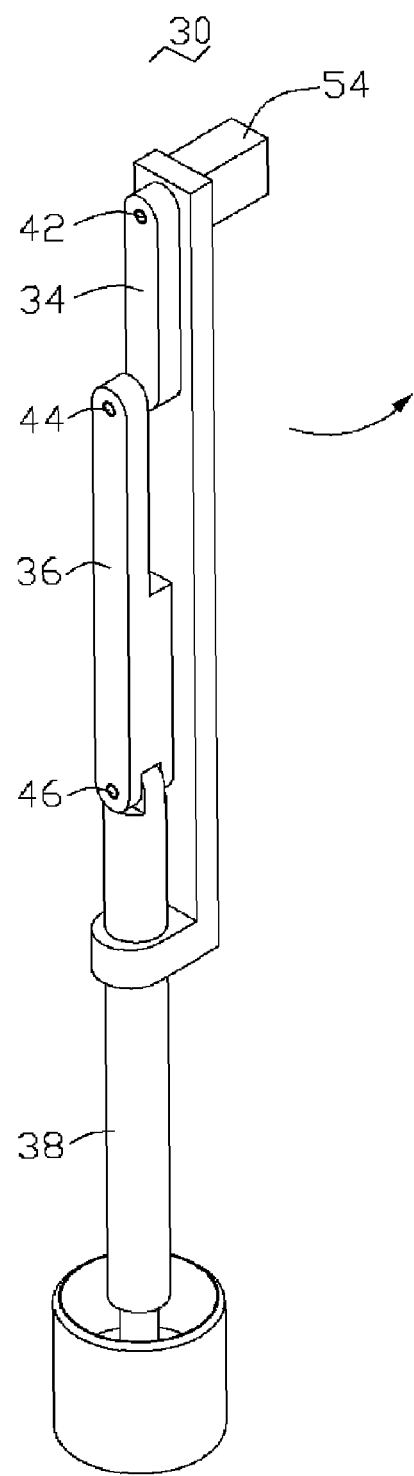
Figure 7:
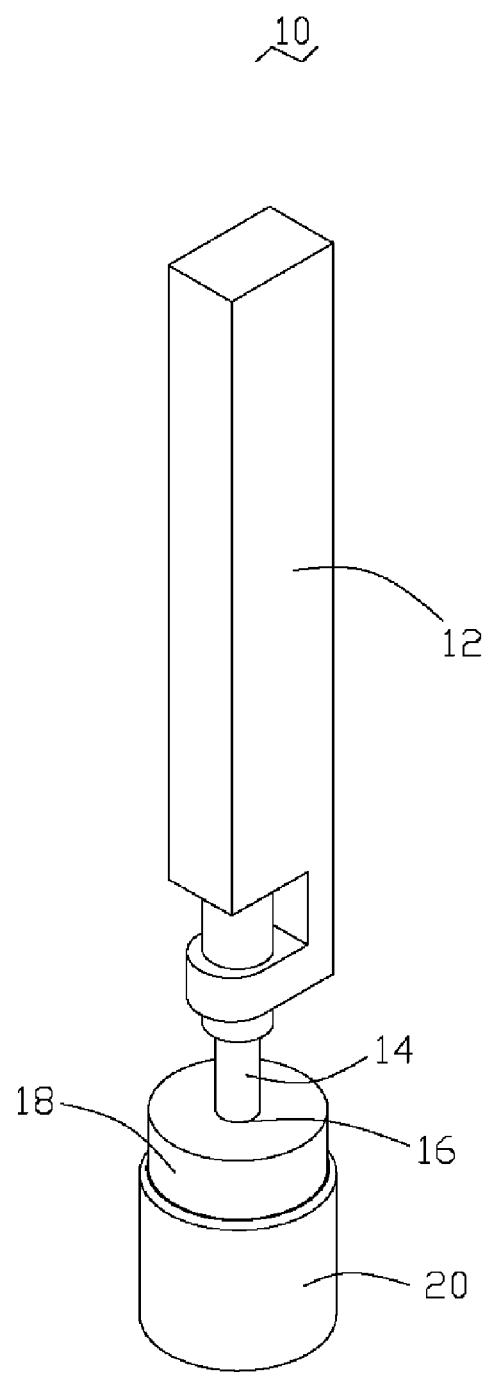
FIG. 7 is a schematic, isometric view of a typical apparatus for manipulating lenses.

The operation principle of the apparatus 30 is described as follows, using the suction nozzle as an example for lens-holder 48. Referring to FIGS. 2 to 6, firstly, the lens-holder 48 secures a lens 50, and the lens 50 is aligned with an opening 520 of a barrel 52. At that moment, the first pivot 42, the second pivot 44, and the third pivot 46 are substantially aligned. The first pivot 42 is disposed between the second pivot 44 and the third pivot 46. In the illustrated embodiment, the driving rod 34 is driven by the motor 54 to rotate around the first pivot 42. The rotate movement of the driving rod 34 causes movement of the linking rod 36 and the driven rod 38. Referring to FIG. 4, when the driving rod 34 rotates to a horizontal position, the lens 50 is just about out of the opening 520 of the barrel 50. Accordingly, the speed of the driven rod 38 reaches its slowest point. As a result, the lens can be prevented from tilted, scratched, or broken. Referring to FIG. 5, during the period of the driven rod 38 pushing the lens 50 into the barrel 52, the speed of the driven rod 38 is on the rise. Referring to FIG. 6, when the second pivot 44 is disposed between the first pivot 42 and the third pivot 46, the lens 50 is located on the bottom of the barrel 52 and is released by the lens-holder 48.

It is to be noted that although such a link mechanism is exemplarily illustrated in the embodiment, different link mechanisms can be alternatively selected according to practical application, within the spirit of the present invention, in that the speed of the lens being assembled may be modified by using different linkage systems.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. An apparatus for manipulating a lens, comprising:
   a frame with a guiding member formed on a side surface thereof, the guiding member comprising a through hole defined therein;
   a driving rod having one end pivotedly connected to the frame;
   a linking rod having one end pivotedly connected to the other end of the driving rod; and
   a driven rod extending through the through hole of the guiding member, the driven rod having one end pivotedly connected to the other end of the linking rod, and the other end comprising a lens-holder configured for holding the lens.

2. The apparatus as described in claim 1, wherein the lens-holder comprises a suction nozzle.

3. The apparatus as described in claim 1, wherein the lens-holder comprises a clamping jaw.

4. The apparatus as described in claim 1, further comprising a motor configured for driving the driving rod to rotate.

5. The apparatus as described in claim 1, wherein the driven rod comprises a telescoping assembly including an outer tube and an inner tube slidably received in the outer tube.

6. An apparatus for manipulating a lens, comprising:
   a frame having a guiding member, the guiding member defining a guideway;
   a driving rod having a first end pivotedly connected to the frame, and an opposite second end;
   a driven rod lengthwise movable in the guideway of the guiding member, the driven rod having a lens-holder arranged at a first end thereof configured for holding a lens, and an opposite second end; and
   a linking rod pivotedly interconnected between the second end of the driving rod and the second end of the driven rod.

7. The apparatus as described in claim 6, wherein the lens-holder comprises a suction nozzle.

8. The apparatus as described in claim 6, wherein the lens-holder comprises a clamping jaw.

9. The apparatus as described in claim 6, further comprising a motor configured for driving the driving rod to rotate.

10. The apparatus as described in claim 6, wherein the driven rod comprises a telescoping assembly including an outer tube and an inner tube slidably received in the outer tube.

* * * * *